3,310,533
PREPARING POLYURETHANES
Wilbur R. McElroy, Hillside, W. Va., assignor to Mobay Chemical Company, Pittsburgh, Pa., a corporation of Delaware
No Drawing. Filed Jan. 2, 1962, Ser. No. 163,863
9 Claims. (Cl. 260—77.5)

This invention relates to polyurethanes and in particular it concerns novel procedure by which thermoplastic polyurethanes of high hardness and that are difficult or impossible to work can be prepared in forms such that they can be easily utilized.

Polyurethane plastics are obtained from reaction of organic polyisocyanates and an active hydrogen bearing organic material and are well known for such applications as molding, castings, caulks, sealants, adhesives and the like. They are characterized by excellent physical properties and resistance for various chemicals.

While many of the better known polyurethane plastics have been considered to be thermosetting materials, thermoplastic linear polyurethane plastics are also known. In addition, in the copending application Ser. No. 166,692, filed Jan. 16, 1962, of the present applicant, there are disclosed other novel thermoplastic polyurethanes in which significant cross-linking occurs. Thermoplastic polyurethanes are particularly interesting because, in addition to the excellent properties that characterize them, they can be used in a manner such that imperfect products and normally waste material can be reclaimed thereby reducing the overall cost of the products prepared.

Thermoplastic polyurethane plastics can be produced in a range of hardness from soft to very hard substances. When such materials are exceedingly hard, working of them becomes difficult and frequently impossible.

In a polycondensation reaction designed to produce a thermoplastic polyurethane, the ratio of isocyanate groups to other reactive groups which react with isocyanates must be controlled carefully. If the reactants are metered together and mixed continuously, the result is not satisfactory because of the normal difficulties associated with the accuracy of such a process. The accuracy is much better if a batch process is used and the reactants accurately weighed into the reactor. However, when a thermoplastic polyurethane is made in a batch process and the reaction is carried to completion in the reactor, the final product has such a high melting point that it cannot be removed from the reactor without heating to above its decomposition temperature. On the other hand, if the material is removed from the reactor before the reaction is complete and cast into a mold in the form of a thick casting, and then heated to complete the reaction, the nature of the material is such that it cannot be reduced in size for normal use with ordinary machinery, or if cast into sheets or slabs, the inconvenience and handling costs are prohibitive.

It is, therefore, the primary object of the present invention to provide a novel method for making thermoplastic polyurethane plastics particularly useful for molding and extrusion practices and the like, that are very hard or tough as produced yet can be readily worked by conventional procedures.

This and other objects are attained in accordance with this invention, generally speaking, by interrupting the normal polyurethane producing reaction of a polyisocyanate and an active hydrogen containing organic compound, physically deforming the intermediate product to the desired physical characteristics, and then continuing the reaction in a manner that does not permanently alter those physical characteristics. The initial reactants are liquid, and reaction is initiated in the conventional manner of polyurethane production in practicing the present invention. However, when the reaction mixture becomes particularly viscous so that conventional mixing becomes difficult, the then partially reacted but flowable reaction mix is cast and cooled to solidify the product and stop material reaction. Thereupon, the solid intermediate product which at this stage is workable with ordinary machinery is ground or otherwise reduced to a particle form thereafter usable in extruding or molding or analogous practice. The particle material is reheated to an elevated temperature but below its flow point and the reaction is continued to further cure the particles so that a more cured thermoplastic particulate material results. There thereby results a partially cured thermoplastic polyurethane plastic that, as produced, is handleable by conventional, convenient economic practices despite the fact that it is difficult or impossible to crush or break with a hammer or too tough to reduce in size materially in a mill when in a massive bulk form after it is completely cured.

In producing polyurethane plastics in accordance with this invention, the reactants are used in relative amounts such that the NCO to active hydrogen ratio is within the overall range of about 0.7 to 1.3, and preferably is within the range of about 0.7 to 1.03. Where the excess of NCO groups is such to bring the overall ratio to about 1.1 to 1.3, it should be understood that curing should be controlled as to time and temperature to minimize allophanate formation. At NCO to active hydrogen ratios below 0.7 or above 1.3, the physical properties of the products generally are undesirable. The reactants are mixed at room temperature or at the minimum elevated temperature that is found most convenient considering the need to pour and agitate the reactants. Where mixtures of active hydrogen containing organic compounds are used, they can be premixed or added individually or all brought together at the same time. It has been found that the active hydrogen containing organic compounds can be added to the polyisocyanate or the polyisocyanate can be added to the active hydrogen containing organic compounds and thus it is not critical that a substantial excess of either NCO or OH groups are present at any given intermediate time. The reaction is exothermic, and cooling is sometimes applied to slow the reaction and keep it within reasonable temperature limits.

It is of the essence of this invention to interrupt the reaction as soon as it has been sufficiently completed to result in a solid upon cooling to ambient temperature. This state is visually evidenced by the reaction mixture becoming very viscous and difficult to stir, and usually occurs in about 15 minutes to 2 or 3 hours. The reaction mixture viscosity at reaction temperature at this stage is usually within the range of 15000 to 50000 centipoises. At this time, the reaction is temporarily terminated, as by casting the reaction mixture and cooling to ambient temperature. The product at this stage is of such a nature that it is readily reduced in size with conventional machinery. The resulting solid is crushed or cut or broken by a hammer or ground by a mill to a satisfactory size, e.g. minus 4 mesh (Tyler) or finer. Then the reaction is completed in the solid state in those particles by heating them to an elevated temperature, generally at least 65° C., but below the flow point and maintaining that temperature to cure the product. This terminal portion of the reaction can be speeded by raising the temperature as the flow point of the particles rises with the increasingly completed reaction state. By maintaining the temperature below the flow point, the particles will not fuse to one another, and any sticking that does occur is usually so slight that it can be overcome by manual pressure.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Generally, the polyisocyanates are limited to the diisocyanates. However, the triisocyanates and those of higher functionality can also be used subject to the limitation that the sum of all the reactive groups on the tri- and higher functional isocyanates as well as on other reactive compounds present as tri- and higher functional monomers is not greater than about 20 percent of all of the reactive groups, other than NCO, that are present. Suitable representative organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3' - dichloro - 4,4'-biphenylene diisocyanate, p,p',p'' - triphenylmethane triisocyanate, 1,5 - naphthalene diisocyanate, furfurylidene diisocyanate or polyisocyanates in a blocked or inactive form such as the bis-phenyl carbamates of 2,4- or 2,6-toluylene diisocyanate, p,p,'-diphenylmethane diisocyanate, p-phenylene diisocyanate, 1,5 - naphthalene diisocyanate and the like. The preferred diisocyanates are the commercially available mixture of toluylene diisocyanates which contains, by weight, 80 percent of 2,4-toluylene diisocyanate and 20 percent of 2,6-toluylene diisocyanate or 4,4'-diphenylmethane diisocyanate.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are polyaralkylene ethers such as propylene or ethylene oxide adducts of phenol and the like; hydroxyl polyesters; polyhydric polyalkylene ethers; polyhydric polythioethers; polyacetals; aliphatic polyols including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and an —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 300 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not cirtical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, b-hydromuconic acid, a-butyl-a-ethyl-glutaric acid, a-b-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid, 1,4-cyclohexanedicarboxylic acid, 3,4,9,10-perylenetetracarboxylic acid and the like. These same acids also may be used as such a representative active hydrogen containing organic compounds. Typical polyhydric alcohols that can be used for reaction with the foregoing acids to produce hydroxyl polyesters include, by way of example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable polyhydric polyalkylene ether as well as mixtures thereof may be used such as, for example, the condensation product of an alkylene oxide or of an alkylene oxide with a polyhydric alcohol. Any suitable polyhydric alcohol may be used in producing those ethers such, for example, as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-pentane diol, 1,7-pentane diol, glycerine, trimethylol propane, 1,3,6-hexanetriol, triethanolamine, pentaerythritol, sorbitol and the like. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins, and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 0.5 to about 50 mols of alkylene oxide per functional group of the dihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951), or in United States Patent 1,922,459.

Any suitable polyhydric polythioether may be used such as, for example, the condensation product of thiodiglycol or the reaction product of a polyhydric alcohol such as is disclosed above for the preparation of the hydroxyl polyethers with any other suitable thioether glycol. Other suitable polyhydric polythioethers are disclosed in United States Patents 2,862,972 and 2,900,368.

Any suitable aliphatic polyol may be used including alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexanediol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentane-1,5-diol, 2-hexane-1,6-diol, 2-heptane-1,7-diol, and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as, 1-hexene-1,3,6-triol and the like; alkyne triols such as, 2-hexyne-1,3,6-triol and the like; alkane tetrols such as, for example, 1,2,5,6-hexane tetrol and the like; alkene tetrols such as, for example, 3-heptane-1,2,6,7-tetrol and the like; alkyne tetrols such as, for example, 4-octyne-1,2,7,8-tetrol and the like.

Any suitable aliphatic thiol including alkane thiols containing two or more —SH groups such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like may be used.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as for example, ethylenediamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamine 5-aminomethyl pyrimidine, 2,5-diamine-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxy propyl) ethylene diamine, as well as compounds of any of the classes set forth above which are substituted with halogen such as, for example, chloro, iodo, bromo and the like; nitro, alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphate and the like.

It should be kept in mind that while the foregoing compounds can be used in the present invention they must be used within the limitations set forth hereinbefore that the product be thermoplastic and the like.

A catalyst may be used in the reaction mixture leading to the production of the thermoplastic polyurethanes. Suitable catalysts are, by way of example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are, for example, tin compounds such as, stannous chloride, tin salts of carboxylic acids, such as dibutyl tin di-2-ethyl hexoate, tin alcoholates such as stannous octoate, as well as other organo metallic compounds such as are disclosed in United States Patent 2,846,408 and in copending application Ser. No. 835,450. If desired for any purpose, a conventional reaction regulator such as water, a triol, urea, substituted urea, amines or the like can also be used in the normal manner.

Thermoplastic polyurethanes prepared by the present invention are of particular interest for extruding and molding purposes. However, they can also be used in lacquers, as adhesives and for coatings and other purposes. In many such practices, they would be combined in an inert solvent such as, for example, xylene, ethyl acetate, toluene, ethylene glycol monoethylether acetate and the like. The resulting compositions can be applied in any suitable fashion as by dipping, brushing, roller coating and spraying onto a substrate. Any suitable substrate may be coated with the coating compositions of the invention such as, for example, wood, paper, porous plastics, such as, for example, sponge rubber, cellular polyurethane plastics, foamed polystyrene and the like as well as metals such as steel, aluminum, copper and the like. The coating composition need not contain a solvent for all applications. The coating and other compositions prepared as in this invention may contain any suitable pigment such as, for example, iron oxide, carbon black, titanium dioxide, zinc oxide, chrome green, lithol red and the like, as well as the usual fillers such as carbon black sawdust or the like, if desired.

This invention will be described further by way of the following specific examples in which the details are given by way of illustration and not by way of limitation. In these examples, as well as elsewhere in the specification, all parts and percentages are by weight unless otherwise stated.

*Example 1*

A diisocyanate mixture composed of 80 percent 2,4-toluylene diisocyanate and the remainder 2,6-toluylene diisocyanate, in an amount of 365.2 parts by weight, is added in a period of 30 minutes at 70° to 83° C. to a dry mixture of polyols consisting of 102 parts by weight of polypropylene glycol having a molecular weight of 425, 102 parts by weight of a polypropylene glycol having a molecular weight of 1000, 234 parts by weight of dipropylene glycol, 38.4 parts by weight of a triol having a molecular weight of about 3000 and prepared by reacting glycerine and propylene oxide, 0.179 part by weight of di-tertiarybutylcreson, and 3.6 parts by weight of trimethylol propane. The NCO/OH ratio is 1.02, based on the OH number of the polyol mixture. The mixture is then heated during an additional 30 minutes to 145° C. and cast in trays and allowed to cool immediately to room temperature. The material is incompletely reacted at this stage and is a hard friable solid. It is ground to minus 4 mesh. The ground material is then heated in a dry nitrogen atmosphere at 110° C. for 18 hours to complete the reaction. The particles adhere together but can be broken apart by hand, and grinding to minus 4 mesh again is readily accomplished.

This resin, after reacting in the ground-up condition, has a flow point of about 190° C. Samples are extruded at 290° to 360° F. Parts which are compression molded at 315° F. and 4000 p.s.i., have a Shore D hardness of 83, about 7500 p.s.i. tensile strength and Izod notched impact strength of 0.5 ft. lb./in. of notch. The molded parts are water white transparent and optically clear.

*Example 2*

A polyol is made from 1.00 equivalent of dipropylene glycol containing 0.03 weight percent of di-tertiarybutyl cresol and 0.02 equivalent of a triol having a molecular weight of about 3000 and prepared by reaction of glycerine and propylene oxide. The polyol mixture is placed in a closed reactor and 1.04 equivalents of a diisocyanate mixture composed, on a weight basis, of 80 percent 2,4-toluylene diisocyanate and the remainder 2,6-toluylene diisocyanate are added. The total weight of reactants is 889 grams. The diisocyanate mixture is added over a period of 30 minutes while stirring the polyol mixture, at a temperature in the range of 60° to 80° C. Thereafter the mixture is stirred for an additional 55 minutes during which time the temperature is maintained at 143° C. It is then cast into aluminum trays and cooled to about room temperature. The solidified material is ground to minus 4 mesh (Tyler). The ground material is then heated under nitrogen at 110° C. for 40 hours and then at 140° C. for 2 hours. The particles adhere to one another somewhat, but can be broken apart by hand and readily be passed through a grinder to result in the minus 4 mesh size again.

A sample of the polyurethane taken after the 110° C. cure shows that it has a melting range of 188° to 196° C. and after the 140° C. cure, the melting range is 182° to 190° C. Parts can be extruded from the powder at a temperature range of 320° to 380° F. Other parts can be compression molded from the material obtained after the 110° C. cure, at 4000 p.s.i., 315° F. in 5 minutes. Solubility tests after both extrusion and molding show that the polyurethane swells in common solvents. The Shore D hardness of the products is 87, the tensile strength about 7800 p.s.i. and the Izod notched impact strength is 0.4 ft. lb./in. of notch.

*Example 3*

A diisocyanate mixture is made with 503.2 parts of a mixture composed of 80 percent 2,4-toluylene diisocyanate and 20 percent 2,6-toluylene diisocyanate and 137.6 parts of 4,4'-diphenylmethane diisocyanate. A mixture of polyols and polyesters is made from 248.8 parts of an hydroxyl polyester obtained from ethylene glycol and adipic acid and having an hydroxyl number of about 56, an acid number less than one and a molecular weight of about 2000, 82.4 parts of the bis beta-hydroxy ethyl ether of hydroquinone, 128.8 parts of a polypropylene glycol having a molecular weight of about 2025, 370.4 parts of dipropylene glycol and 117.6 parts of a triol having a molecular weight of about 3000 and prepared by reacting glycerine and propylene oxide. The latter mixture is added to the diisocyanate mixture over a period of 35 minutes; the initial temperature of 45° C. rises to 92° C. during the addition. Thereafter, the resulting mixture is heated to 128° C. and held for one hour. It is then cast to aluminum trays. After grinding to minus 4 mesh (Tyler), the resulting powder is cured by heating for 20 hours at 75° C. and then 4 hours at 110° C. The resulting polyurethane is molded at 350° F., at a pressure of 1800 p.s.i. in 5 minutes. Its melting range is 163° to 176° C., its Shore D hardness is 77, the tensile strength of molded sheet is 5300 p.s.i. and the Izod notched impact strength is 0.9 ft. lb./in. of notch.

*Example 4*

A polyol mixture is prepared from 0.01 equivalent of a polypropylene glycol having a molecular weight of 2000, 1.025 equivalents of dipropylene glycol that contains 0.03 weight percent of di-tertiarybutyl cresol, and 0.045 equivalents of a triol having a molecular weight of about 3000 and prepared by reaction of glycerine and propylene glycol and which contains 0.03 weight percent of di-tertiarybutyl cresol. This mixture is added to 1.090 equivalents of a diisocyanate mixture of 80 percent 2,4-toluylene diisocyanate and the remainder 2,6-toluylene diisocyanate. The overall NCO/OH ratio is 1.01 and the total weight of the mixture is 1305 grams. The polyol mixture is added to the diisocyanates over 43 minutes and the initial temperature of 60° C. rises to 93° C. during the addition. The resulting mixture is then heated to 141° C. for 73 minutes. While still flowable, it is cast and cooled. After grinding to minus 4 mesh (Tyler), the resulting powder is cured at 75° C. for 65 hours under an atmosphere of nitrogen. The original melting point after curing is 182° to 188° C., and after molding this range is 185° to 190° C.; the product swells in the presence of conventional solvents both before and after molding. This material is readily compression molded at temperatures on the order of 320° to 340° F., 4000 p.s.i. and in 5 to 10 minutes. In the molded state, it has a Shore D hardness of 78, a yield strength of 5230 p.s.i., a tensile strength ranging from about 5800 to 6700 p.s.i. and an 11 percent yield elongation. The Izod notched impact strength is 0.5 ft. lb./in. notch. This product is water white and optically clear.

*Example 5*

To a diisocyanate mixture composed of 80 weight percent 2,4-toluylene diisocyanate and the remainder 2,6-toluylene diisocyanate in an amount of 0.8660 equivalent is added a polyol mixture made from 0.7980 equivalent of dipropylene glycol that contains 0.03 weight percent of di-tertiarybutyl cresol, 0.0375 equivalents of a triol having a molecular weight of about 3000 and prepared by reaction of glycerine and propylene oxide and containing 0.03 percent of di-tertiarybutyl cresol and 0.0120 equivalents of trimethylol propane. The overall NCO/OH ratio if 1.02 and the total weight of resulting mixture is 1653 grams. The period of addition is 40 minutes and the temperature rises from 65° to 94° C. Then after heating for 70 minutes at 137° C., the product is cast into trays. Upon cooling to room temperature, the solidified product is ground. Thereafter, the ground material is cured by heating for 20 hours at 75° C. and then for 4 hours at about 110° C., under an atmosphere of nitrogen. The melting range before and after the final portion of the cure is 160° to 182° C. and 180° to 189° C. respectively. The melting range after molding is 184° to 194° C. Before and after molding, this polyurethane swells in the presence of common solvents such as acetone. Compression molding is readily carried out at 335° to 350° F., 4000 p.s.i. in 5 minutes. The Shore D hardness of the product is 82, the yield strength 8090 p.s.i., and the Izod notched impact strength is 0.53 ft. lb./in. of notch. The product is water white and optically clear.

*Example 6*

A polyol mixture is prepared from 0.0208 equivalent of a propylene glycol having a molecular weight of 2025, 0.5850 equivalent of dipropylene glycol containing 0.03 weight percent of di-tertiarybutyl cresol and 0.030 equivalent of a triol having a molecular weight of about 3000 prepared by reacting glycerine and propylene oxide and also containing 0.03 weight percent of ditertiarybutyl cresol. The polyol mixture is added to 0.6421 equivalent of a diisocyanate mixture containing 80 weight percent 2,4-toluylene diisocyanate and 20 weight percent 2,6-toluylene diisocyanate. The overall NCO/OH ratio of the resulting mixture is 1.01 and the total weight is 1742 grams. The polyol mixture is added over a period of 40 minutes and the initial temperature of 70° C. rises to 88° C. The mixture is then heated to 134° C. for 75 minutes before casting into aluminum trays and cooling to room temperature. The solid in the trays is then ground to minus 4 mesh (Tyler). Thereafter, it is cured, in powder form under nitrogen, by heating at 75° C. for 20 hours followed by 4 hours of heating at 110° C. The melting point of the resulting powder is 169° to 181° C.; after molding the melting point is 170° to 181° C. The Shore D hardness of the product is 68, the yield strength over 1600 p.s.i. and the tensile strength is over 4650 p.s.i. Its molded plate color is water white and optically clear.

*Example 7*

Four equivalents of a polyol mixture containing 0.03 weight percent of di-tertiarybutyl cresol, having an equivalent weight of 109.5, and made in a ratio of 1 part by weight of a polypropylene glycol having a molecular weight of 425, 1 part by weight of a polypropylene glycol having a molecular weight of about 1000 and 2.32 parts by weight of dipropylene glycol were used in this example. A triol having a molecular weight of about 3000 and prepared by reaction of glycerine and propylene oxide, in an amount of 0.04 equivalent, and 0.136 equivalents of trimethylolpropane are added to the 4 equivalents of the above mentioned polyol mixture. A diisocyanate mixture, in an amount of 4.268 equivalents, composed of 80 weight percent 2,4-toluylene diisocyanate and the remainder 2,6-toluylene diisocyanate is added to the polyol mixture in a closed reactor over a period of 35 minutes and at a reaction mixture temperature of 70° to 80° C. The overall NCO/OH ratio is 1.02. The mixture is then heated 70 minutes to a maximum temperature of 142° C. After casting in trays and grinding to minus 4 mesh (Tyler), the resulting particles are cured by heating at 70° C. under nitrogen for 65 hours. The melting point of the product is 178° to 188° C. and it has an Izod notched impact strength of 0.6 ft. lb./in. of notch.

The foregoing examples are merely representative of the invention and numerous other examples are possible. However, these specific examples are of particular interest for they evidence the widely varying mixtures of reactants that can be used. The products have high heat distortion temperatures, high and narrow range melting temperatures, are light stable and otherwise have very good physical properties.

It will be appreciated that the invention can be practiced otherwise than as set forth in the specific examples. For example, the first stage of the reaction can be carried out in a solvent such as, for example, chlorobenzene or the like; in that event, the solvent would be removed before producing the particle product. Machine mixing can be practiced if desired. The examples demonstrate thermoplastic products in which significant cross-linking occurs. Obviously, thermoplastic polyurethanes can be produced in the absence of cross-linking. Where significant cross-linking is to occur, it is preferred that the cross-linking materials be restricted to no more than about 20 mol percent of the total reactive groups and the average molecular weight of the active hydrogen containing organic compounds be less than about 1000. All parts and percentages stated hereinbefore are by weight unless otherwise indicated. The equivalents indicated in the examples are mol equivalents.

In accordance with the provision of the patent statutes, I have explained the principle of my invention and have described what I now believe to represent its best embodiment. However, it should be understood that, within the spirit and scope of the appended claims, the invention can be practiced otherwise than as specifically described.

I claim:

1. In the preparation of a thermoplastic polyurethane, the steps comprising reacting an organic polyisocyanate and an organic compound containing at least two active hydrogen containing groups as determined by the Zerewitinoff method, said groups being reactive with an isocyanate group, in amounts such that the NCO to active hydrogen ratio is in the range of about 0.7 to 1.3, interrupting the reaction when the reaction mixture has become viscous enough to make conventional mixing difficult by cooling the reaction mixture to room temperature to obtain a solid, reducing the resulting solid to particles, continuing the reaction in the solid particulate state by heating the particles at an elevated temperature but below the flow point of the said particles, and recovering the resulting thermoplastic particles.

2. A method in accordance with claim 1 in which said reaction is completed in the solid particulate state at increasing temperature as the reaction approaches completion.

3. A method in accordance with claim 1 in which said organic compound containing at least two active hydrogen containing groups is a mixture of such organic compounds and contains 0.1 to 20 mol percent of such compounds having more than two active hydrogen containing groups per molecule.

4. In the preparation of a thermoplastic polyurethane, the steps comprising reacting an organic polyisocyanate and a mixture of polyols containing at least two active hydrogen containing groups per molecule of polyol, as determined by the Zerewitinoff method, said groups being reactive with isocyanate groups, in amounts such that the NCO to active hydrogen ratio in the reaction mixture is in the range of about 0.7 to 1.3, interrupting the reaction when the reaction mixture has become viscous enough to make conventional mixing difficult by cooling the reaction mixture to room temperature to obtain a solid, reducing the resulting solid to particles, continuing the reaction in the solid particulate state by heating the particles at an elevated temperature but below the flow point of the said particles, and recovering the resulting thermoplastic particles.

5. A method in accordance with claim 4 in which said NCO to active hydrogen ratio is within the range of about 0.7 to 1.03.

6. A method in accordance with claim 5 in which the reaction is completed in the solid particulate state at increasing temperature as the reaction approaches completion.

7. A method in accordance with claim 4 in which said organic polyisocyanate is a diisocyanate and said mixture of polyols is a mixture of dihydric polyethers.

8. A method in accordance with claim 7 in which the NCO to active hydrogen ratio is in the range of 0.7 to 1.03.

9. A method in accordance with claim 8 in which the reaction is completed in the solid particulate state at increasing temperature as the reaction approaches completion.

References Cited by the Examiner

UNITED STATES PATENTS

| 3,210,272 | 10/1965 | Foster | 260—77.5 |
| 3,240,842 | 3/1966 | Saunders | 260—858 |
| 3,058,955 | 10/1962 | Newmann et al. | 260—75 XR |

FOREIGN PATENTS

| 537,295 | 2/1957 | Canada. |
| 732,624 | 7/1955 | Great Britain. |
| 848,980 | 9/1960 | Great Britain. |

LEON J. BERCOVITZ, *Primary Examiner.*

M. C. JACOBS, *Assistant Examiner.*